US010147201B2

(12) United States Patent
Simon

(10) Patent No.: US 10,147,201 B2
(45) Date of Patent: Dec. 4, 2018

(54) METHOD OF DETERMINING A DIRECTION OF AN OBJECT ON THE BASIS OF AN IMAGE OF THE OBJECT

(71) Applicant: THALES, Courbevoie (FR)

(72) Inventor: Alain Simon, Les Mesnuls (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/563,516

(22) PCT Filed: Mar. 30, 2016

(86) PCT No.: PCT/EP2016/056852
§ 371 (c)(1),
(2) Date: Sep. 29, 2017

(87) PCT Pub. No.: WO2016/156352
PCT Pub. Date: Oct. 6, 2016

(65) Prior Publication Data
US 2018/0082438 A1 Mar. 22, 2018

(30) Foreign Application Priority Data
Mar. 30, 2015 (FR) ...................................... 15 00636

(51) Int. Cl.
*G06T 7/73* (2017.01)
*G06T 7/80* (2017.01)
(Continued)

(52) U.S. Cl.
CPC .................. *G06T 7/74* (2017.01); *G06T 7/80* (2017.01); *G06T 2207/10016* (2013.01);
(Continued)

(58) Field of Classification Search
CPC combination set(s) only.
See application file for complete search history.

(56) References Cited

U.S. PATENT DOCUMENTS 7,564,031 B2 * 7/2009 Fine ..................... H04N 5/2254
250/234
7,888,644 B2 * 2/2011 Fine ..................... H04N 5/2254
250/234
(Continued)

OTHER PUBLICATIONS

Mani Golparvar-Fard et al., "AR A 4-Dimensional Augmented Reality Model for Automating Construction Progress Monitoring Data Collection, Processing and Communication," Journal of Information Technology in Construction, Jun. 2009, pp. 129-153, XP055254105.
(Continued)

*Primary Examiner* — Anand P Bhatnagar
(74) *Attorney, Agent, or Firm* — Baker & Hostetler LLP

(57) ABSTRACT

The invention relates to a method of determining the absolute direction of an object of a scene (1), with a predetermined desired performance. It comprises a learning phase and an online operation phase, the learning phase comprising the following steps: acquisition by circular scanning by means of a first optronic imaging device of determined fixed position, of a series of partially overlapping optronic images (2), including an image or several images of the scene (step A1), automatic extraction from the images, of descriptors defined by their image coordinates and their radiometric characteristics, with at least one descriptor of unknown direction in each overlap (21) of images (step B1), from the descriptors extracted from the overlaps between images, automatic estimation of the mutual relative rotation of the images and mapping of the descriptors extracted from the overlaps (step C1), identification in the images, of at least one known reference geographic direction (22) of precision compatible with the desired performance, and determination of the image coordinates of each reference (step D1), from the descriptors extracted from the overlaps and mapped, the
(Continued)

direction and the image coordinates of each reference, automatic estimation of the attitude of each image, called fine registration step (step E1), from the attitude of each image, the position and internal parameters of the first imaging device, and the image coordinates of each descriptor, computation of the absolute directions of the descriptors according to a predetermined model of image capture of the imaging device (step F1), the online operation phase comprising the following steps: acquisition of at least one image of the object called current image (20), from a second imaging device of determined fixed position (step A2), extraction of descriptors from each current image (step B2), mapping of the descriptors of each current image with the descriptors whose absolute direction was calculated in the learning phase, to determine the absolute direction of the descriptors of each current image (step C2), from the absolute directions of the descriptors of each current image, estimation of the attitude of each current image (step D2), from the image coordinates of the object in each current image, the attitude of each current image, the position and predetermined internal parameters of the second imaging device, computation of the absolute direction of the object according to a predetermined model of image capture of each current image (step E2).

17 Claims, 6 Drawing Sheets

(51) Int. Cl.
   *H04N 5/225* (2006.01)
   *H04N 5/232* (2006.01)
(52) U.S. Cl.
   CPC ............... *G06T 2207/10032* (2013.01); *G06T 2207/10048* (2013.01); *G06T 2207/20081* (2013.01); *G06T 2207/30244* (2013.01); *G06T 2207/30252* (2013.01); *H04N 5/2258* (2013.01); *H04N 5/23238* (2013.01)

(56) References Cited

U.S. PATENT DOCUMENTS

| | | | | |
|---|---|---|---|---|
| 8,208,792 | B2* | 6/2012 | Morioka | G11B 27/034 386/248 |
| 8,600,700 | B2* | 12/2013 | Vogel | G01B 11/26 702/151 |
| 8,743,199 | B2* | 6/2014 | Kostrzewski | G02B 5/09 348/143 |
| 9,294,672 | B2* | 3/2016 | Georgiev | G03B 17/17 |
| 9,860,443 | B2* | 1/2018 | Ford | H04N 5/2254 |
| 10,078,164 | B2* | 9/2018 | Yun | B29D 11/00644 |
| 2004/0165075 | A1* | 8/2004 | Okada | G03B 13/00 348/207.99 |
| 2006/0152487 | A1* | 7/2006 | Grunnet-Jepsen | G06F 3/0325 345/158 |
| 2007/0024725 | A1* | 2/2007 | Mihara | G02B 5/04 348/272 |
| 2008/0191127 | A1* | 8/2008 | Fine | H04N 5/2254 250/235 |
| 2008/0198041 | A1* | 8/2008 | Sallier | G01C 5/005 340/978 |
| 2009/0179144 | A1* | 7/2009 | Fine | H04N 5/2254 250/234 |
| 2011/0221767 | A1* | 9/2011 | Kostrzewski | G02B 5/09 345/629 |
| 2015/0207990 | A1* | 7/2015 | Ford | H04N 5/2254 348/262 |

OTHER PUBLICATIONS

Edoardo Ardizzone et al., "Visual Saliency by Keypoints Distribution Analysis," Image Analysis and Processing, ICIAP 2011, Sep. 14, 2011, pp. 691-699, XP019164538.
Bruce Lucas et al., "An Iterative Image Registration Technique with an Application to Stereo Vision," Proceedings DARPA Image Understanding Workshop, Apr. 1981, pp. 121-130.
Jianbo Shi et al., "Good Features to Track," Proceedings CVPR, IEEE Computer Society Conference on Computer Vision and Pattern Recognition, 1994.
K. M. Gorski et a., "HEALPix: A Framework for High-Resolution Discretization and Fast Analysis of Data Distributed on the Sphere," The Astrophysical Journal, vol. 622, No. 2, 2005.

* cited by examiner

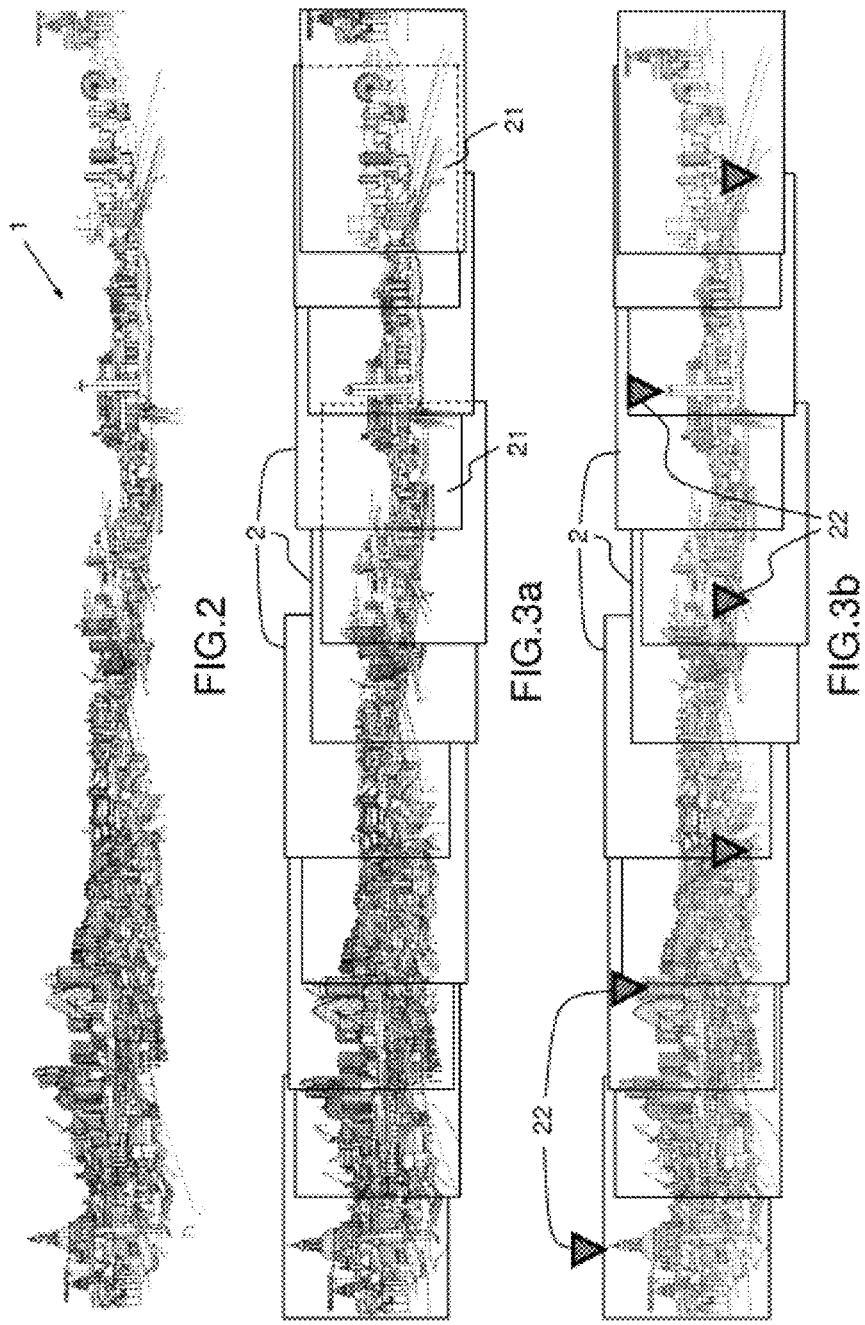

METHOD OF DETERMINING A DIRECTION OF AN OBJECT ON THE BASIS OF AN IMAGE OF THE OBJECT

CROSS-REFERENCE TO RELATED APPLICATIONS

This application is a National Stage of International patent application PCT/EP2016/056852, filed on Mar. 30, 2016, which claims priority to foreign French patent application No. FR 1500636, filed on Mar. 30, 2015, the disclosures of which are incorporated by reference in their entirety.

FIELD OF THE INVENTION

The field of the invention is that of determining the absolute direction (or geographic azimuth and elevation) of an object from a geographic position from which an optronic image thereof is acquired.

BACKGROUND

The determination of absolute geographic directions by means of an optronic imaging device which does not have an orientation device allowing for a direction measurement of quality compatible with that sought, is a technological challenge.

In effect, the systems which attempt to resolve this problem generally use orientation measurement components whose cost remains high to achieve the performance sought which can be of the milli-radian class. For example, an angular performance of 1 milli-radian class to 90% is necessary to contain a location error in the category TLE1 (6 m at 90%) on an object situated at 5 km from the sensor. The orientation measurement devices of this class are rare, expensive and too heavy to be considered in a portable device.

The following solutions which make it possible to measure attitude are not well suited for the following reasons:
- magnetic compasses are inefficient (10 milli-radians class), difficult to incorporate, highly sensitive to the EM environment, use the local magnetic declination (it also being poorly known in the 10 milli-radians class) to transform the magnetic azimuth into geographic azimuth or direction, their cost is relatively low, but can be as high as €1000.
- FOGs (acronym for Fiber Optic Gyrometer), laser gyrometers (RLGs), hemispheric resonator gyrometers (HRGs), are bulky, heavy, heavy electrical consumers and expensive,
- The MEMS are not sufficiently efficient (a few milli-radians), exhibit low maturity and require a calibration procedure that can be lengthy and complex,
- the celestial objects allow high performance but are not always visible (difficulty seeing the stars in day time, or the sun through heavy clouds),
- the positioning systems such as GNSS (acronym for global navigation satellite system), are moderately positioned for the length bases envisaged, and their volume, their weight and their consumption are incompatible with a portable device,
- the use of landmarks often extracted from data of ortho-image (line of sight equivalent to a vertical view) or map type, is not easy to implement when using an image of opportunity (above all when it is small field and a glancing shot) since:
  - this approach first of all requires the availability of the vertical view with the good level of detail,
  - the probability of being able to map a landmark point with a detail present in the image reduces quadratically with the field thereof,
  - the probability of being able to associate several landmarks in an image decreases linearly with their number.

The technique based on the polarization of the sky, a recent technique bio-inspired from the orientation of insects for their navigation, offers low performance levels.

SUMMARY OF THE INVENTION

The aim of the invention is to mitigate these drawbacks.

The method according to the invention proposes a powerful mode for estimating orientations of images and directions of objects of the 1 mrad class, on a portable image acquisition optronic system by using:
- a terrain christening phase (PBT) also designated learning phase which consists in learning and archiving the information on the environment of the scene image, in the forms of signatures characterizing details extracted from the images, in the frequency band or bands of the optronic system, these signatures being also associated with their direction in a geographic reference frame,
- an online operation phase (POL), which consists in using the information archived in the learning phase to determine in real time (typically in less than 3seconds), the geographic direction and possibly the location of objects within an image newly acquired whose signatures are extracted to be compared to the archived signatures.

Hereinbelow:
- the expression (geographic) direction of an object of a scene will be used to designate the vector joining the system to the object; this direction is characterized according to its elevation (angle relative to the plane at right angles to the local vertical) and its geographic azimuth (angle between the geographic north and projection of the direction to the object in the horizontal plane);
- the expression orientation or attitude of an image will be used to qualify the information making it possible to totally orient the image in a reference frame covering the three dimensions of the geographic space (for example, minimally, with the three roll, pitch and yaw Euler angles).

Moreover, the determination of a direction corresponding to a pixel of an image depends on its image coordinates and is done using a parametric geometrical model of the optronic system. The parameters of the model depend on the position of the system and on the orientation of the image as well as on internal parameters (like the focal length or distortion of the optronic sensor).

More specifically, the subject of the invention is a method of determining the absolute direction of an object of a scene, with a predetermined desired performance. It is mainly characterized in that it comprises a "terrain christening" phase or PBT (or learning phase) and an online operation phase or POL.

The "terrain christening" phase comprises the following steps:
- acquisition by circular scanning by means of a first optronic imaging device of determined fixed position, of a series of partially overlapping optronic images, including an image or several images of the scene (step A1), automatic extraction from the images, of descriptors defined by their image coordinates and their radiometric characteristics, with at least one descriptor of unknown direction in each image overlap (step B1), from the descriptors extracted from the overlaps between images, automatic estimation of the mutual relative rotation of the images and mapping of the descriptors extracted from the overlaps (step C1), identification in the images, of at least one known reference absolute geographic direction of precision compatible with the desired performance in a local geographic reference frame, and determination of the image coordinates of each reference (step D1), from the descriptors extracted from the mapped overlaps, the direction and the image coordinates of each reference, automatic estimation of the attitude of each image, called fine registration step (step E1), from the attitude of each image, the position and internal parameters of the first imaging device, and the image coordinates of each descriptor, computation of the absolute directions of the descriptors according to a predetermined model of image capture which models, in parametric form, the image capture physics of the imaging device (step F1), that is to say the geometrical path of the photons of the scene on a pixel of the detector.

The online operation phase comprises the following steps:

acquisition of at least one image of the object for which determination of the direction is sought, called current image, from a second imaging device of determined fixed position (step A2), extraction of descriptors from each current image (step B2), mapping of the descriptors of each current image with the descriptors whose absolute direction was calculated in the "terrain christening" phase, to determine the absolute direction of the descriptors of each current image (step C2), from the absolute directions of the descriptors of each current image, estimation of the attitude of each current image and possibly of internal parameters like the focal length and/or the distortion of the second imaging device (step D2), from the image coordinates of the object in each current image, the attitude of each current image, the position and predetermined internal parameters of the second imaging device, computation of the absolute direction of the object according to a predetermined model of image capture of each image of the object (step E2).

This method, that could be qualified as odometric compass, thus implements a preliminary learning phase (typically less than 3 min) by characterizing the environment of the imaging device then a real time operation phase which uses the information learned to determine the absolute directions of images and deduce therefrom those objects present in the images.

The learning proceeds from a so-called "terrain christening" phase which consists in acquiring overlapping images over all or part of the horizon rotation and in learning the environment by extracting and constructing compressed information which characterizes its content in the frequency bands of the imaging device.

The use of a current image then makes it possible to determine instantaneous geographic directions of objects present in these images.

It is implemented by observing the following conditions of use:

on a portable optronic system, possibly allowing the possibility of using a light physical support of tripod type, in an environment not necessarily having GNSS signal reception or, in an equivalent manner, on a system not necessarily including the GNSS receiver (of GPS, Glonass, Galileo type for example), without orientation means or with means of low cost (< €100), low weight (<100 g), low quality (10 mrad class), therefore without gyrometer, without quality inertial instruments (UMI, CNI), without goniometer etc.

possibly without moving the optronic system longitudinally or vertically, without particular knowledge on the object to be located, in particular of geographic coordinates or dimensions type, without the system being able to exchange information with the object (in particular of collaboration type), without knowledge in the scene zone corresponding to the acquired image of the object, in particular of landmarks, dimensions, and other such type.

The desired performance typically lies:

in azimuth in the domain ranging from 0.5 to 2 mrad for the PBT and the POL, in elevation,
 with inclinometer accessible in POL, better than 20 mrad in PBT and around 1 mrad in POL,
 without inclinometer accessible in POL, from 1 to 2 mrad in PBT and in POL.

Thus, from the moment that there is a relatively light elevation measurement equipment item of inclinometer type, the difficulty consists essentially in restoring in real time a direction of the mrad class in azimuth bearing in mind that the compass-based traditional SWaP systems are more of the 10 mrad class.

The focal length of the first imaging device can be different from the focal length of the second imaging device.

According to a feature of the invention, a precise position of the first imaging device and/or the internal parameters including the focal length of the first imaging device are estimated in the fine registration step and/or the internal parameters, including the focal length of the second imaging device of the online phase, are estimated in the step of estimating the attitude of the current image.

Preferably, the first and second imaging devices are one and the same imaging device.

According to a feature of the invention, the descriptors of the "terrain christening" phase are archived in a database with their radiometric characteristics and their absolute directions.

A map of spatial distribution of the descriptors can be constructed before the online operation phase.

The series of images acquired in the "terrain christening" phase advantageously covers a complete horizon rotation.

The series of images acquired in the "terrain christening" phase can cover a portion of complete horizon rotation; at least two references (reference absolute geographic directions) are then identified in the images.

The position of the first imaging device is determined by positioning means with which said device is equipped or is estimated from several references. Likewise for the position of the second imaging device.

The method can comprise a step of construction of a panoramic image from finely registered images, each pixel of the panoramic image being associated with an absolute direction.

The images acquired are for example video images.

Each reference is typically a terrestrial landmark or a celestial object.

The first and second imaging device is mounted onboard a platform of fixed position or onboard a mobile platform of known trajectory such as a land or naval vehicle or an aircraft.

BRIEF DESCRIPTION OF THE DRAWINGS

Other features and advantages of the invention will become apparent on reading the following detailed description, given by way of non-limiting example and with reference to the attached drawings in which.

From one figure to another, the same elements are identified by the same references.

DETAILED DESCRIPTION

The invention is based on a learning of scene content by image processing and on the use of this information in order to determine directions of objects present in an image of the scene with a good absolute accuracy and rapidly. Once its direction is determined, the object can possibly be located in the environment.

The method according to the invention can be implemented on terrestrial cameras not requiring an internal positioning means (GNSS receiver), attitude measurement device (UMI, magnetic compass, gyro), even installation means (tripod), or rangefinder.

One of the technical problems to be resolved which underlies these phases of learning and then of calculating directions of objects, is to orient the images acquired while observing the following conditions of use:

- on a portable optronic system, possibly allowing the possibility of using a light physical support of tripod type,
- in an environment not necessarily having GNSS signal reception or, in an equivalent manner, on a system not including a GNSS receiver (of GPS, Glonass, Galileo type for example),
- without orientation means and therefore without gyrometer, or with means of low cost (<€100), low weight (<100 g), low quality (10 mrad class), without quality inertial instruments (UMI, CNI), without goniometer, etc.,
- possibly without moving the optronic system longitudinally or vertically,
- without particular knowledge on the object to be located, in particular of geographic coordinates or dimensions type,
- without the system being able to exchange information with the object,
- without knowledge in the scene zone corresponding to the acquired image of the object, in particular of landmarks, dimensions and other such type.

Figure 1:
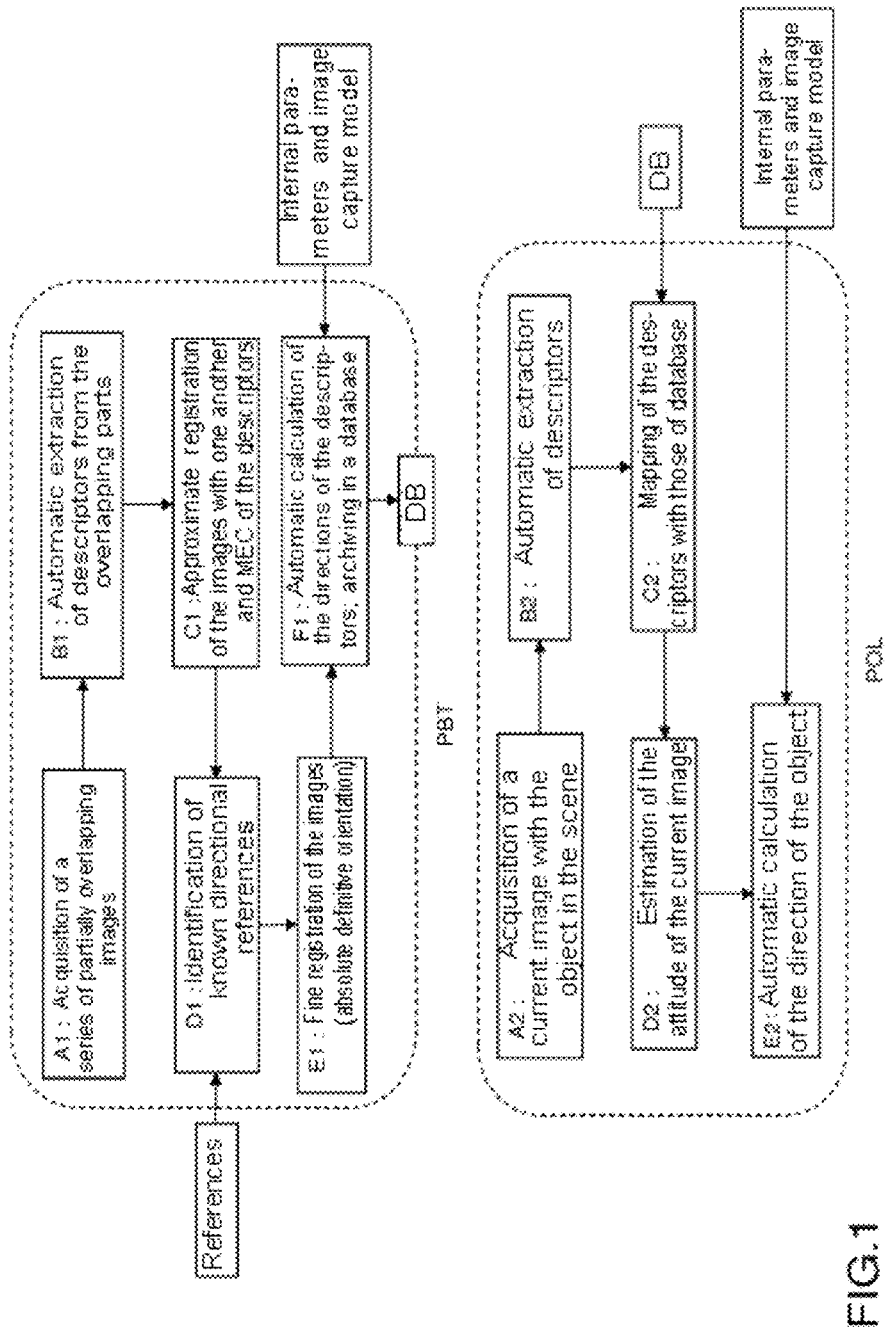
FIG. 1 represents a flow diagram of the main steps of the method according to the invention, FIG. 2 schematically represents an example of panorama to be scanned during the terrain christening phase, FIG. 3a schematically represents an example of images acquired by scanning of the panorama of FIG. 2, and FIG. 3b, these images on which references of known direction are indicated.

The method for determining the direction of an object of a scene from the position of acquisition of an optronic image, with a predetermined desired performance, is described in relation to FIG. 1. It is implemented by means of an optronic system equipped:

- with an optronic device for acquiring images (or imaging device) in the visible or IR domain such as a camera or binoculars, of predetermined internal parameters (focal length and possibly field of view (FoV), main image point, parameters describing the radial and tangential optical distortion, pitch of the photosensitive cells in the two image directions), of known position and which can therefore to this end be provided with a positioning device of GNSS receiver type (GPS, GLONASS, Galiéo, etc.), or any other means making it possible to be positioned in the required precision like DLORAN (differential long range navigation), mapping and manual input, communication of the position by remote means, etc., but it will be seen hereinbelow that, without such a device, the position can nevertheless be known, and
- with a unit for processing the acquired images.

The method mainly comprises two phases: a learning phase called "terrain christening" and an online operation phase.

The "terrain christening" phase comprises the following steps:

A1) Acquisition of a series of partially overlapping optronic images, including one or several images of the scene in which the object, for which the direction will be determined during the next phase, will be situated a priori.

B1) Automatic extraction from the images, of descriptors of interest with at least one descriptor of unknown direction in each image overlap.

C1) From the descriptors of the overlaps, estimation of the mutual relative rotation of the images, and mapping of the descriptors of the overlaps, from one image to another adjacent image.

D1) Identification in the images of at least one known absolute directional reference, and determining image coordinates of each reference.

E1) From the descriptors of the overlaps mapped, the direction and the image coordinates of each reference, estimation of the attitude of each image, of the position of the imaging device and possibly estimation of its internal parameters including the focal length.

F1) From the attitude of each image, the position and the internal parameters of the first imaging device, and the image coordinates of each descriptor, computation of the absolute directions of these descriptors.

The steps will now be detailed.

Figure 4:
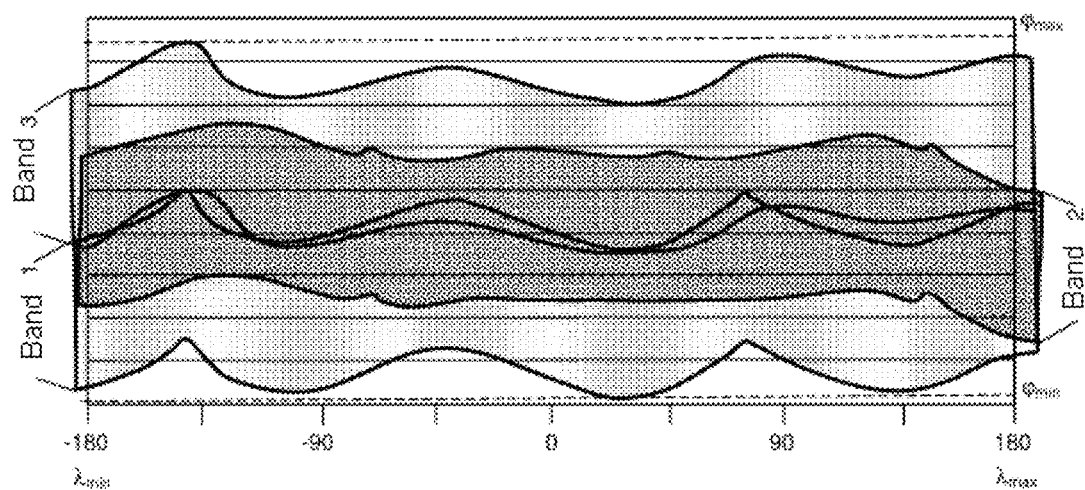
FIG. 4 illustrates the acquisition of images according to three mean elevations and forming three bands, with, on the x axis, the relative bearing and, on the y axis, the elevation, FIG. 5 schematically represents, by plan view, different ways of acquiring the image information over a horizon rotation, in the form of a continuous video sequence with a strong overlap between the images (a), by acquisition image by image with overlap adapted and controlled during the acquisition (b) and according to a mixed mode combining a continuous sequence acquired first, with, secondly, a few sparse images acquired one by one over the horizon rotation without requiring overlap between them but rather with those acquired first (c)
Figure 5:
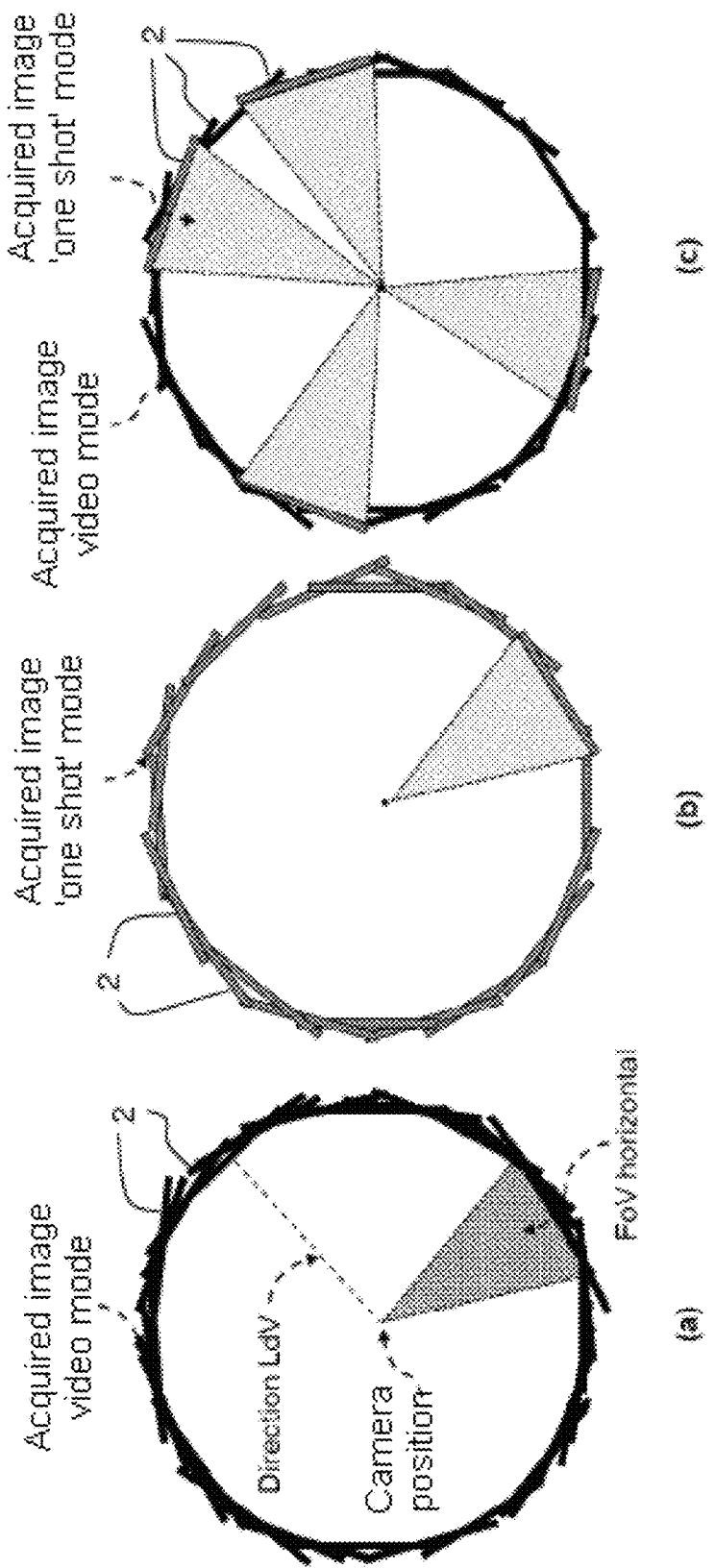
Figure 6:
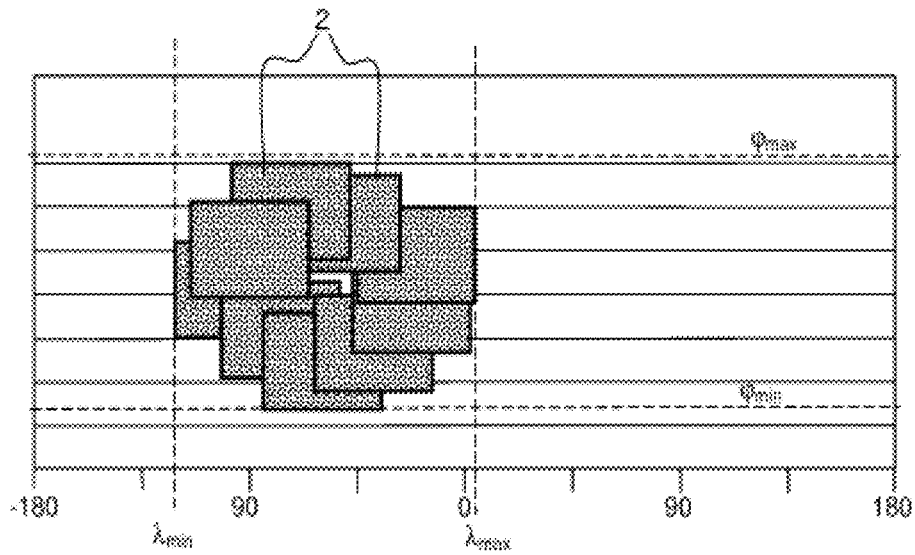
FIG. 6 illustrates an example of footprint in the scene and of overlapping of images acquired by a circular scanning in the azimuth directions according to λ and the elevation directions according to φ, without covering a complete horizon rotation.

A1) automatic acquisition (from a platform equipped with a "Pan and Tilt" mechanism, a mechanism that makes it possible to program the orientation of the acquisitions in specific directions relative to the platform and which makes it possible to orient a system, possibly automatically in a programmable manner, or from an aircraft), quasi-automatic acquisition (video) or acquisition image by image by an operator, by scanning of the scene 1 according to a closed figure which can be circular, an example of which is shown in FIG. 2, by means of a first optronic imaging device of determined position, of a series of partially overlapping optronic images 2 shown in FIG. 3a, including one or more images of the scene (generally smaller than the scene 1) in which the object for which the direction will be determined during the next phase, will be situated a priori. The acquisition is performed in a visible or IR channel, with a specific field of view of the device. The overlap 21 of an image on the adjacent image is preferably between 30% and 60%; it can vary from one image to another as can be seen in FIG. 3b. Preferably, the field of view covered by all of these images is that of a complete horizon rotation as is the case in FIG. 3b and FIGS. 7 and 8. In effect, the method has the advantage of having a loop closure, that is to say an overlap between an image already acquired (the first for example but not necessarily) and the last (for example but not necessarily inasmuch as the penultimate one would do just the same). This loop closure is performed:

over a complete horizon rotation with a single scanning in elevation (1 band is obtained), so as to obtain an overlap in relative bearing, over a portion of the complete revolution with several scans staged in elevations according to different bands (for each elevation, a band is obtained by scanning) by a movement of rectangular or elliptical type of the line of sight (LdV) of the first imaging device, so as to obtain an overlap in relative bearing and in elevation of the bands corresponding respectively to the scans, as can be seen in FIGS. 4 and 6, by combining the two preceding approaches and by performing several horizon rotations with the same mean elevation or with distinct mean elevations as in FIG. 5.

Figure 8:
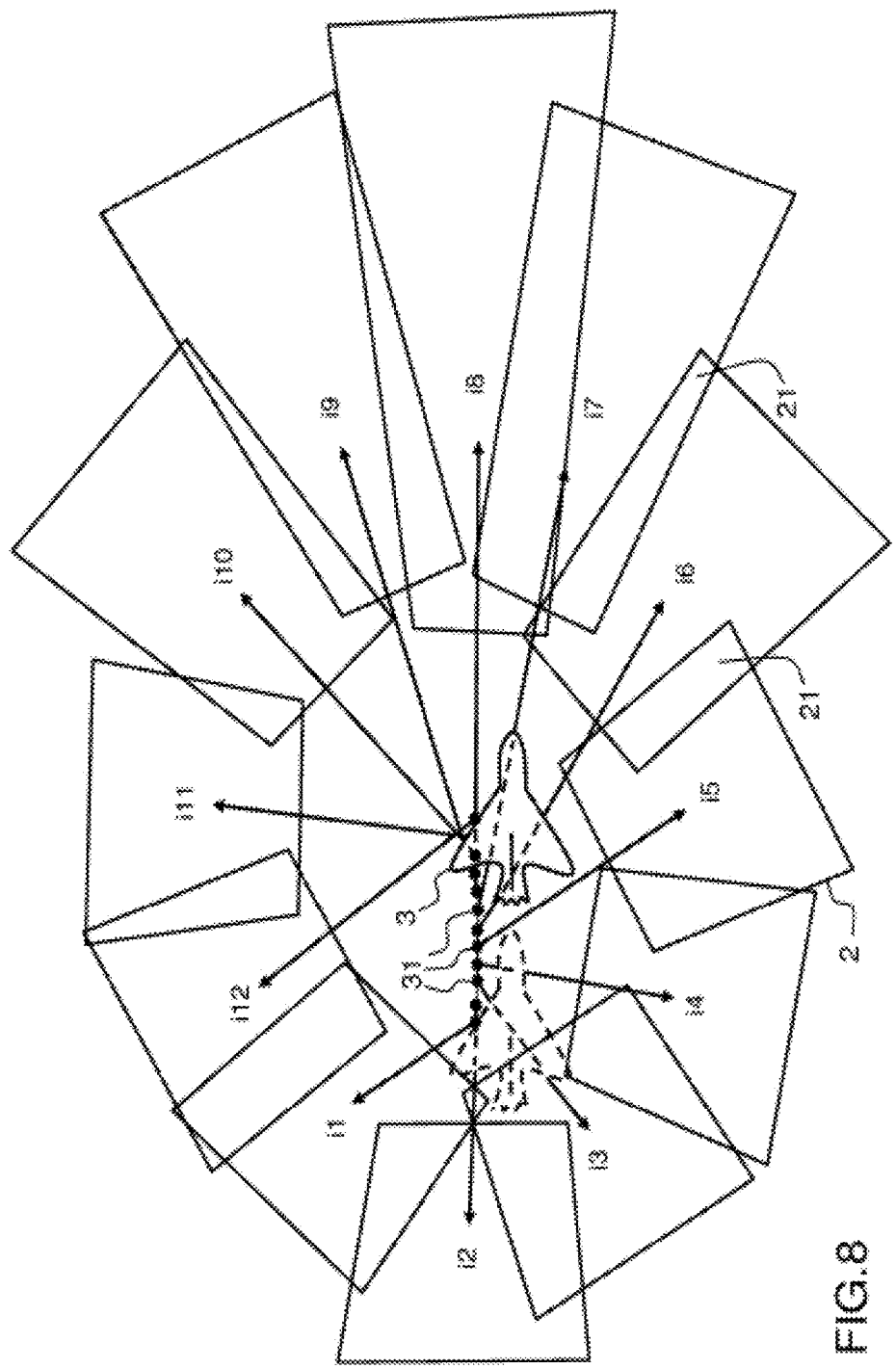

In situations where the performance of an acquisition over a complete revolution is not accessible, the procedure is limited to a scan with movements of the LdV at different elevations, in the form of ellipses or of figure 8 for example. This type of observation is insufficient for correcting certain internal parameters like the focal length for example, in the absence of GCP (acronym for ground control point) in the form of terrestrial landmarks or of celestial objects, but does make it possible to refine values of a few observable quantities like the angular drift for example. To manage to refine a focal length value of the imaging device in such a situation, two reference directions will advantageously be used in the sequence of images acquired.

The wavelengths corresponding to the images acquired in PBT can be in different spectral bands with:
 a visible color daytime sensitivity, Near Infra-Red (NIR),
 a daytime and nighttime sensitivity in SWIR (small wave), MWIR (medium wave) or LWIR (long wave) bands.

Several image acquisition and acquired image processing modes can be envisaged.

The acquisition, which can be manual or automatic (Pan & Tillt, or more generally performed by means of an optronic system mounted on a platform with or without automatic control) can be performed according to the following modes:

(MAV) a video acquisition mode which has a high rate acquisition capacity (eg. 10 to 100 Hz), schematically represented by (a) in FIG. 5;

(MAI) an image-by-image acquisition mode which allows the acquisition of the images one by one with a longer acquisition time (for example from some 0.1 to 1 Hz) as illustrated by (b) in FIG. 5. The triggering of the acquisitions can be manual or programmed, in particular on a system using a Pan & Tilt platform;

(MAM) a mixed acquisition mode which constructs the image information at the processing input stage, by inserting, into a sequence acquired in MAV mode, images acquired in MAI mode (see (c) in FIG. 5). The benefit of this approach is described a little later.

For the processing, different implementation options can be used:

(MTB) a batch processing method processes the information by accessing all the images stored or archived by batch;

(MTD) a dynamic processing method, performs the processing operations on the fly upon the acquisition of the images needing to simultaneously access only at the very most 2 or 3 images at a given instant;

(MTS) a video segment or piece-wise processing method processes the angular segments one after the other as angular portions in azimuth (for example ¼ or ½ parts of a horizon rotation) or in elevation (for example by assembling bands).

For the acquisition of the images, when the first device has a high rate acquisition capacity (MAV with a rate generally ≥10 Hz), the images acquired are stored at the video rate over the horizon rotation, since there is an apriori wealth of overlaps between images, a step of the method makes it possible to determine the images of this video to be retained. For that, the following will for example be used:

an algorithm of Kanade-Lucas 'An Iterative Image Registration Technique with an Application to Stereo Vision 1981', supplied with Tomasi points "Good Features to Track 1994", which estimates the translations between images;

a decimation of the video according to the calculated overlaps, the FOV ("field of view") of the imaging device and the objective overlap between images.

When the acquisition system has an inclinometer but its elevation measurements cannot be synchronized with the dates of the different image acquisitions—or widely with other auxiliary image data (DAI) which can be in addition to these acquisition dates, approximate measurements making it possible to know the position of the system, all or part of the orientation of the images or of the approximate parameters of the imaging device like an approximate focal length—the process can be conducted in two passes:

the first pass is performed as in video mode (MAV), without recording the DAI is with the corresponding images, the second pass is done in image-by-image acquisition mode by recording the DAIs with the corresponding images. This pass does not require any overlapping of the images acquired (see FIG. 7). More specifically, a sampling of the horizon rotation is performed so as to have, in distinct azimuths, several images and corresponding auxiliary image data such as the elevation measurements; typically fewer than 10images (and corresponding measurements) make it possible to have sufficient information. The objective is to have overlaps of these images with those of the preceding pass and to maintain the LdV of the optronic system for a sufficient duration in order to have a synchronous elevation measurement for each acquisition. The images from this pass are then systematically inserted into that of the first pass to form the input sequence of images for the processing operations of the subsequent steps with the feature of having an elevation of quality compatible with the precision objective.

In the case of image-by-image acquisition (MAI), the operator must take a few precautions in order to ensure an overlapping of the images. In the case of acquisition in video mode (MAV), the overlaps are often significant and the method preferably has added to it a step of automatically sorting the images by eliminating the images or descriptors that are too redundant.

When the first image acquisition device has several fields and/or zooms, the acquisition of the "terrain christening" phase can be performed in wide field so as to reduce the acquisition delay but also if necessary to have a stronger probability of embracing the landmarks on a single image.

In practice:
In MAI mode, the operator controls the orientation of the first image acquisition device and a sufficient overlapping of the images by moving the image acquisition device and by triggering recordings of images one by one on each orientation that it retains. In this mode, the number M of images to be acquired is of the order $M \approx \alpha/[FOV.(1-\eta))]$, where $\eta$ is the mean overlap between images expressed in %, FOV is the longitudinal FOV of the image expressed in the same unit as the angle $\alpha$ which represents the horizontal angle scanned during acquisitions. For an acquisition over the complete horizon rotation $\alpha=360°$, and with, for example, an image acquisition device of 6° lateral field and an overlap between images of 60%, the number of images to be acquired is M=150 images. This number of images can be reduced by half if a vertical overlap of 20% of the field is accepted but this last approach does not a priori make it possible to obtain as many descriptors, or therefore as many "good" descriptors, which can have an impact on the quality of the estimation.

In MAV mode, the acquisition is performed automatically by angular segment (with one of the two preceding video or manual modes) and the acquisition is possibly stopped when the memory reaches a certain threshold. At this stage, the images acquired are processed so as to extract the descriptor information. In addition to the descriptors for supplying the database (database of descriptors), the operator can retain from one to a few images to position landmarks, the memory being freed of the other images.

In addition to these acquisitions guided by the user, the device can also be implemented with a platform having a "Pan and tilt" mechanism or any other mechanism making it possible to program the orientation of the acquisitions in specific directions relative to the platform.

For the processing of the images, the practical choice of one of the processing methods is conditioned by the memory and the computation capacity (CPU) available. When the memory (in light of the size of the video) and the computation capacity of the processor (CPU with regard to the acceptable delay for the user) allow it, the batch processing method (MTB) is recommended inasmuch as it allows the simultaneous management of all the information (including multiple overlaps) and offers a better control of consistency of the parameters estimated. In the case of memory or CPU inadequacy, a dynamic processing will process the data extracted from the images one after the other.

The choice of the processing method directly impacts the estimation technique retained in the step E1 (FIG. 1). MTB suggests a batch approach of Gaus-Newton or Levenberg-Marquard least squares types whereas the dynamic processing method (MTD) steers toward an extended Kalman filter (EKF) or even UKF (for unsected Kalman filter).

When the first image acquisition device (or imaging device) has a memory that is too small to store all the images of a horizon rotation, the acquisition is processed:
either with MTB but by progressively freeing the memory of the images and storing the extracted descriptor information,
or with MTD method or the segment processing method (MTS).

At the output of this step, the system has a sequence of images with suitable overlap and on which the processing operations of the subsequent steps will be carried out.

Preferably, whatever the mode of acquisition of the images, a reference image will be chosen from these images.

B1) automatic extraction from the images of descriptors of interest defined by their image coordinates and their radiometric characteristics, with at least one descriptor of unknown direction in each image overlap 21 (one descriptor is sufficient if there is a measurement of elevation with inclinometer available for example, otherwise provide at least two descriptors). The descriptors extracted from the parts of images without overlap are also used since, once the parameters of the image capture model are characterized, they can benefit from an orientation of quality likely to be used in the online operation phase. The operator can also manually define descriptors by designating details and their mappings in images. Such information can also be used to:
orient the images relative to one another in the subsequent step C1, then in absolute fashion in the subsequent step E1 in terrain christening phase;
determine the orientation of an image in online operation phase when the designated details have a sufficiently characteristic radiometric signature.

The descriptors detected in the images are by way of non-limiting example of the following types:
SIFT acronym for scale invariant features translation. In this case, they are key points characterized by an information vector describing the histogram of the gradients around the pixel considered. This step is typically performed according to the description initially owed to Lowe 2001.

SURF, acronym for speeded up robust features. Like SIFT, this approach locates details (primitives) in images and characterizes them in an alternative faster than the SIFT approach.

FREAK, acronym for fast retina keypoint (Alahi et al IEEE 2012).

Haris points and image moments.

In practice, the algorithm for extracting descriptors is configured so as to ensure that:

The number of descriptors extracted is satisfactory for the application (for example at least 2 per zone of overlap). This feature can in particular be more difficult to check in zones with few details, because of the composition of the scene, or particular lightings of the detector. For that, adjustments are made primarily on parameters specific to the algorithm for extracting descriptors (threshold, pyramidal processing level, etc.).

The spatial density of the descriptors is not too great. In this situation, on the one hand, the size of the systems to be estimated thereafter is pointlessly increased, and, on the other hand, the risk of wrongly associating descriptors is increased.

In practice, the selection algorithm will eliminate descriptors corresponding to directions that are angularly too close in light of the FOV of the imaging device.

Some of these descriptors are known to be more or less robust to the changes in-between images:
- of scale (or variation of zoom),
- of orientation (relative rotation from one image to another),
- of translation.

Whatever the algorithm used, a descriptor is associated with a pixel corresponding to a detail of the scene which exhibits a specific signature relating to its vicinity in the spectral band of the image acquisition device.

In addition to the freedom of scale by choosing a zoom and/or a field specific to the acquisition device, the acquisition can be chosen to be in a specific spectral band if the first acquisition device has several channels (e.g. IR/VIS). In addition to the field/number of images compromise already described, the interest of the operator is focused on choosing the channel exhibiting the best contrasts. In the case of nighttime use, the choice is obviously limited to the IR or active channels that the acquisition device may have.

C1) from the descriptors extracted from the overlaps, automatic mappings (MEC) (also called pairings) of the descriptors of the overlaps, from one image to another adjacent image and automatic estimation of the mutual relative rotation of the images possibly via the reference image. This step is often designated rough or approximate registration. The detection of details of the scene giving rise to possible multiple overlaps (more than 2 images) can be performed in a subsequent phase after a first relative orientation between images has been performed; the purpose of this is to guide the search for descriptors that may be linked to more than 2 images.

This estimation of the orientation and of the pairings between descriptors can be conducted simultaneously by proceeding, for example, in the following manner known to those skilled in the art:

a. computation of a first relative transformation with a minimum number of 2 MECs with an algorithm of TRIAD type, b. estimation of the 'good' MECs (inliers) with an algorithm of RANSAC (or PROSAC type) (acronyms for RANdom SAmple Consensus, and PROgressive SAmple Consensus), in order to discard the aberrant MECs (outliers) between images, c. estimation of an optimal transformation on the basis of all the good mappings (inliers), with an algorithm "q-method" or "QUEST" (QUaternion ESTimator) or "SVD method" or of Gauss-Newton type for example.

D1) Identification in the images, automatically or by an operator, of at least one known absolute directional reference 22 as shown in FIG. 3b, such as a terrestrial landmark or a celestial object, of precision compatible with the desired performance, and determination, automatic or by the operator, of the image coordinates of each reference. The aim of this step is to associate the image coordinates with the geographic or spatial direction (azimuth, elevation) of the references used.

in an automatic procedure, it is for example possible to automatically correlate an image associated with a reference datum with image zones around descriptors of the PBT. Note that this approach demands the availability of images associated with the references in CPDV close to those produced in PBT. To this end, an approximate absolute orientation of the PBT images by means of a magnetic compass for example can facilitate the task by greatly reducing the pairing combinatories, in a non-automatic approach, it is possible to envisage:
a specific semi-automatic mode, in which the operator points to the reference at the image center and performs specific measurements (angular with inclinometer and magnetic compass for example and potentially of distance with a laser rangefinder harmonized with the image center)

a manual pointing mode in which the operator designates, in an image, the reference so as to associate its image coordinates with its spatial direction.

When the reference is a terrestrial landmark, it is easy to determine the characteristics of its direction (azimuth and elevation) from the position of the camera. The accuracy of the direction is then a function of the accuracy of the coordinates of the landmark, of those of the camera position, of the landmark designation accuracy and of the distance between the landmark and the camera.

When the reference is a celestial landmark, the body can for example can be centered on the optical axis then its direction is determined from the camera position, from a UTC date (for example available on GPS) and from celestial body ephemeris or from an astrometric catalogue. The error on the direction then depends on the quality concerning these azimuth and elevation quantities with, for the elevation, an additional contribution of atmospheric refraction correction residues.

When the scanning has covered a complete horizon rotation, a single reference may suffice; but, when the scanning has covered a portion of a complete horizon rotation, at least 2 references are to be identified in the images. In practice, it is sufficient to write the equations of the image capture model which link the vector of the space joining the position of the sensor (x0,y0,z0) to the position (xn,yn,zn) of the reference of the scene, and its position in the image characterized according to its coordinates. The model incorporates:

the internal parameters characterizing the specificity of the geometrical properties in the imaging device, the external parameters set according to the attitude of the image or of the imaging device and its spatial position.

In this step, image orientation parameters have been estimated approximately. The raw estimation of these parameters will supply initial values to the next step which will perform the definitive estimation of their values.

E1) From the descriptors of the mapped overlaps, from the direction and the image coordinates of each reference, automatic estimation of the attitude of each image, and possibly of a more accurate position of the first imaging device and of its internal parameters including the focal length used during this PBT phase. Although the internal parameters and the position are predetermined, they may be known with insufficient accuracy (that is to say accuracy incompatible with the objective of final direction quality as illustrated hereinbelow); this step, often called fine registration step makes it possible to define them more finely.

The need for quality of the internal parameter formed by the focal length is illustrated by a numerical example. For that, a matrix detector of size w=1000 pixels and an optic giving it an FOV of 10° is considered. The focal length of the imaging device is f=2/(2 tan(FOV/2)), i.e. a focal length of 5715 pixels for a mean pixel size (or the IFOV) of 175 µrad. If the initial focal length is assumed known to within 1%-value which is situated within the traditional range of uncertainty concerning this quantity—that corresponds to an error (of over/under-zoom type from image to image) of approximately 5 pixels corresponding to an angular deviation of 0.9 mrad, i.e. an image-to-image error which would be approximately 1 mrad (of the order of the overall performance sought) but which, after a few images, would rapidly become incompatible with the final class of quality of direction sought (the zoom error effect being cumulative). This simple computation indicates the importance of the proposed process being able to re-estimate the internal parameter formed by the focal length of the imaging device.

Different approaches can be used for this step, those which can be cited including:
- BA (Bundle Adjustment) for coherently readjusting all of the image-capture parameters of the images and the characteristics of the observations (here, MEC descriptors).
- PNP, acronym for perspective N points, including the position-finding or P3P procedure based on 3 imaged points of geographic coordinates,
- P2PA, which is an active P2P based on the assumption that the position of the imaging device is fixed and known, and that the scanning is circular,
- PNP with bundle adjustment.

Depending on the user required in terms of application and of control of the correct operation of the automatic algorithms, it is possible to provide a step:
of construction and display of a panoramic image from the finely registered images, each pixel of the panoramic image being associated with an absolute direction,
of display of information associated with the information of the descriptors and of the map of spatial description of the descriptors (CDSD).

Generally, observations of distance type can be acquired on an optronic system equipped with a rangefinder harmonized with the line of sight (LdV) of the system, such as, for example, with a portable system on which the user can manually orient the LdV on a detail of the landscape and find the range thereof. This detail corresponds either to a descriptor (geographic coordinates and direction initially unknown) or to a landmark (geographic coordinates a priori known) and the distance observation is then useful in the estimation procedure (BA or PNP) implemented in this step E1.

F1) From the attitude of each image, from the position and the possibly more accurate internal parameters of the first imaging device, and from the image coordinates of each descriptor (the descriptors of the overlaps and of the others), automatic computation of the absolute directions of these descriptors according to the geometrical model of image capture of the imaging device. These descriptors are archived in a database (BDD) with their radiometric characteristics and their absolute directions.

This archiving is preferably performed so as to facilitate the search for pairing in POL. For that, the descriptors are ordered, notably by azimuth, to use the arrangement of their values with a geometrical chopping technique in the online pairing step, in particular when an approximate azimuth measurement is available (for example by the use of magnetic compass).

It may be possible to construct a map of spatial distribution of the descriptors (CDSD) which encloses cells corresponding to solid angles or spatial zones. These cells are determined and positioned in azimuth and elevation according to a horizontal and vertical pitch chosen by the process (these angular pitches are generally more fine but of the order of the FOV of the imaging device). Each of the cells indicates the number of descriptors and/or of directions (those of the descriptors and of the references) found in this solid angle:
no descriptor
  if the zone is not covered by any image,
  if the content of the images on the zone does not give rise to the creation of any descriptor in the cell considered,
descriptors that are unpaired because they originate from parts of images which do not exhibit overlap,
paired descriptors with their order of multiplicity, one and the same descriptor being able to be associated with more than 2 images if the overlap between the images is greater than 50%; the overlaps occur in azimuth and, possibly, in elevation.

In the cases where the number of descriptors is very dense and the scene is present over a significant variation of elevation (for example for zones with strong relief, star backgrounds, etc.), the CDSD is preferably constructed in the form of cells with regular surface area. To do this, the use of a representation of HEALPIX (Hierarchical Equal Area isoLatitude Pixelization) is recommended—see for example "HEALPix: A Framework for High-Resolution Discretization and Fast Analysis of Data Distributed on the Sphere" 2005.

The CDSD can be synthesized in binary form:
either to present zones having no descriptors:
  or to present zones having a number of descriptors greater than a given value.
The CDSD can be constructed in a reference frame that is:
relative when the directions of the descriptors and of the references are identified relative to a reference frame associated with a reference image,
approximate absolute when the directions are oriented from magnetic measurements for example,
definitive absolute when the directions are oriented in a reference frame estimated after a bundle adjustment at the end of the terrain christening phase with a quality compatible with the objective targeted.

When there is a magnetic compass available for example, the directions can immediately be pre-situated in the correct cell (with an accuracy better than to within one degree). For that, the cell of the CDSD corresponding to the direction of the descriptor considered is determined by truncating or interpolating the direction of the descriptor to bring it close to the center of a particular cell. Once all the descriptors of all the images are assigned to the cells of the CDSD, and after the bundle adjustment phase, each direction is repositioned with a quality inheriting the reference direction(s) and the CDSD is adjusted from the relative or approximate reference frame to the fine absolute reference frame.

There is thus a CDSD available in table form in which a cell corresponds to a solid angle around the imaging device and which contains the number of descriptors extracted from all of the images (overlaps included).

The CDSD can be filtered so as to enclose, for each spatial cell, only a determined number of descriptors in order to speed up the operation for the online phase. However, it is more effective to filter the descriptors in step B1.

The elimination of descriptors in a cell, can notably be conducted according to the following criteria:
  separation or proximity of the descriptors in the cell,
  radiometric intensity of the signature of the descriptor,
  quality of the associated direction provided that this direction was obtained by means of the information from a preliminary orientation phase.

The CDSD can, initially, be used in the terrain christening phase to:
  determine the space domain on which the images are acquired;
  determine the zone of non-coverage in terms of descriptors over the volume scanned during this christening phase;
  notify the operator for him or her to be able, if necessary, to reacquire these zones with new images if he or she deems them relevant;
  filter descriptors on zones where they are too numerous and therefore redundant with respect to the input of geometrical information and would be "similar" in terms of signature of their radiometric signals.

Generally, the position of the first imaging device is determined by positioning means with which said device is equipped; it can also be estimated from several references.

This terrain christening phase (PBT) having been carried out, the operational direction determination phase or online operation phase (POL) can be begun. It comprises the following steps:
  A2) acquisition, automatic or by an operator, of the image (possibly of several images) of the object whose direction is sought to be determined, called current image 20 shown in FIG. 7, from a second imaging device of determined position, which is preferably the same as for the preceding phase but which can be different; its position can be the same as in PBT phase, above all when it is fixed. In the case of a moving platform, the detail of management of the directions is specified later.

It will be noted that the object whose direction has to be determined in POL, can possibly be absent from the images 2 of the PBT, because of them being absent from the scene in PBT (the object being, for example, a person moving around or a vehicle that can be moved). The descriptors present in the environment of the object should a priori be sufficient in number and have "good characteristics" so as, by aligning them with the robust procedure for mapping the presence of a new object in the image in POL, not to disturb the mapping of the descriptors of the current image with those of PBT as will be seen later. Thus, the attitude of the image in POL can be estimated in the presence of certain changes in the scene between the PBT and POL instants.

Figure 7:
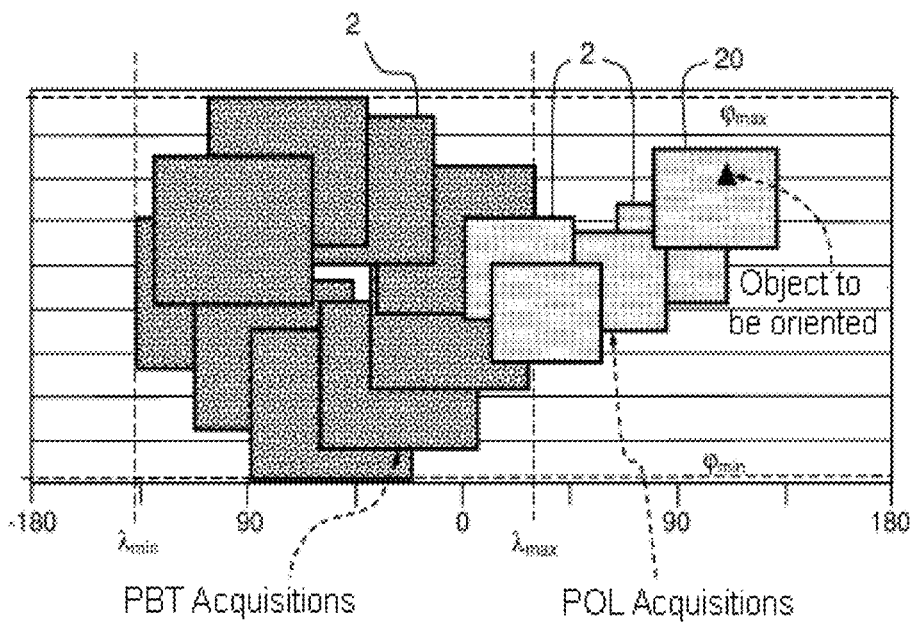
FIG. 7 illustrates a way of adding to the spatial coverage and the information generated in PBT during a POL, FIG. 8 schematically represents an example of acquisition from an aircraft.

Images 2 not containing the object to be oriented can also be acquired during this POL phase as shown in FIG. 7. When one of these images 2 exhibits an overlap with images from the PBT and another exhibits an overlap with an image 20, then:
  the image 20 is processed as in the case of a single image in POL,
  firstly, all of the images 2 (other than the current image 20) are processed as in PBT to construct a "bridge" between the image 20 of the object and the existing database. Their processing makes it possible to add descriptors to the database and increase the spatial coverage of the CDSD. The database and the CDSD can thus be enriched during different online operation phases with the specific feature of having coverage complementing the current CDSD. The enrichment is performed after refinement of the directions of all of the old and new elements (descriptors and images).

B2) Automatic extraction of descriptors in each current image 20.

C2) Automatic mapping of the descriptors in each current image with the descriptors whose absolute direction was calculated in the "terrain christening" phase, to determine the absolute direction of the descriptors of each current image. These paired descriptors of each current image are preferably associated with those of the database of the descriptors.

If, after extraction of the descriptors, their number or quality are deemed insufficient or if the image containing the object is situated in a zone where the CDSD merits densification, then it is possible to perform a local bundle adjustment to refine the directions of the descriptors in order to enrich the database of descriptors with the best information and update the CDSD.

Several information items can be used to facilitate the search for mapping between POL descriptors and those of the database of the terrain christening phase. By using f1 (in PBT) and f2 (in POL) to designate the focal lengths/zoom of the imaging devices and n1 (in PBT) and n2 (in POL) to designate two scale levels internal to the multi-scale information extraction processing operations, it is possible to use:
  At the level of the descriptor radiometry level information: search for mapping at the correct scale level f1. $2^{n1}$=f2. $2^{n2}$. Or, in POL, the scale level n2 to be used to try to associate a descriptor of the PBT (scale level n1) is deduced from the approximate focal lengths in POL (f2) and PBT (f1).
  At the level of the geometrical information, a problem is not generally resolved as if it were lost in space since there is more often than not an approximate orientation of the image available that might typically be improved by a factor of 10 to 30. This in order to determine directions of pixels corresponding to objects of the image with the requisite quality. Thus, starting from the approximate direction of the line of sight (or the approximate orientation of the image) in POL and of the associated errors, a region or a solid angle is generated in which matches with the database will be sought.

The two preceding aspects can be used jointly or individually, the first alone if there is no approximate orientation of the image available, the second alone being also able to be acceptable inasmuch as the focal lengths of the devices of the PBT and POL acquisitions are of the same order.

D2) From the absolute directions of the descriptors of each current image 20, automatic estimation of the attitude of each current image 20 and possibly of the internal parameters of the second imaging device including the focal length.

E2) From the image coordinates of the object in each current image 20, from the attitude of each current image 20, from the position and from the internal parameters (possibly more accurate) of the second imaging device, automatic computation of the absolute direction of the object according to a predetermined image capture model of each current image 20.

The CDSD constructed in the terrain christening can be used online:

in order to assess, in a determined direction (pointing to the object on coordinates) if the database is well-founded on this vicinity, and this before even having produced a current image, to possibly propose a working field of view provided that the imaging device has several fields of view. In the case for example of a PBT performed in small field (PC), it is recommended to acquire a current image at the top end of the useful zone, in wide field (GC) so as to guarantee descriptors in the bottom half of the image.

The CDSD like the database can also be enriched online. For example, when the field of view of a current image extends beyond the current zone characterized, the descriptors extracted beyond the characterized zone enrich the database when the current image has been able to be oriented in absolute terms after the pairing of some of its descriptors with others known from the database.

Generally, the position of the second imaging device is determined by positioning means with which said device is equipped; it can also be estimated from several references of the terrain christening phase.

The optronic system considered can be a portable optronic camera provided with one or more channels allowing nighttime and/or daytime vision. It comprises means of memory and computation unit type and appropriate interfaces for implementing the method in order to facilitate:

In terrain christening phase: the input and acquisition of the data, the presentation of intermediate results (estimation quality, statistics on the mappings, reconstructed image band), and the characteristics and the distribution (CDSD) of the descriptors, the attitudes of the images, the focal length or other estimated internal parameter.

In online operation phase: control elements like the characteristics of the descriptors present in the current image, whether or not they belong to a spatial zone effectively covered by the CDSD with a possible additional need for description of the scene (see FIG. 7), the number of mappings established with the descriptors of the database, the information that is directly usable like the orientation (or the attitude) of the image (or, partially, the direction of the line of sight) and the location of an object at the image center when the latter has been the subject of a distance measurement (case of an optronic system equipped with a rangefinder harmonized with the line of sight for example).

The first and/or the second imaging device can be installed onboard a fixed platform, on a tripod or on a Pan & Tilt. In the case of an imaging device mounted on a conventional tripod, the operator manually triggers the image acquisitions. This case relates equally to a portable optronic camera and to a cell phone, both provided with processing units and interfaces that are appropriate for developing the process. On a Pan & Tilt platform, the acquisition can be programmed with a movement of the imaging device as a function of its characteristics (zone to be covered and field of view in particular) and of the overlaps desired between images. In the case of an imaging device mounted on a moving platform, the implementation of the method presupposes a knowledge of the position of the imaging device via that of the platform, even if the latter can be refined in the step E1. Moreover, the reference directions of the descriptors are recorded in one and the same local geographic reference frame for all of the images of the sequence acquired.

On several recent cell phones, there is an image acquisition mode that makes it possible to construct a panoramic image from several images that can be acquired over a portion of or a complete horizon rotation. A processing qualified as "panoramic stitching" makes it possible to assemble the individual images in order to present an overall panoramic image. Contrary to the objective of the "stitching" which is to have a wider image than that permitted by the field of view of the sensor, the objective of the method according to the invention is to orient an image (apriori limited to the field of view of the sensor) which will be acquired after the panoramic from a given position and to determine the absolute direction of one these pixels generally corresponding to an object of interest of the scene. When applied on a cell phone, the method thus complements algorithms existing in the recent telephones in order to construct a database and a CDSD with a view to determining the direction of an object.

The first and/or the second imaging device can be installed onboard a moving platform such as an aircraft 3 as for example illustrated in FIG. 5. In this case, the optronic system equipped with the imaging device is assumed to have an agility allowing it to orient its line of sight according to different directions under the platform. The imaging device has an automatic control mode allowing it to ensure patterns of circular acquisition of the images 2 as schematically represented in the figure, whatever the trajectory of the platform, within the limitation of its possible maskings. The circular acquisition is indicated by the series of 12 images i1 to i12 with overlaps 21, respectively acquired from 12 positions 31. In this situation, the descriptors extracted from the images representing the ground are characterized as previously by their absolute direction or directly by their geographic coordinates if there is a digital model of the terrain (MNT) of the scene. The benefit of this approach is to naturally establish the geographic coordinates in a common reference frame (for example WGS84). The directions established in each image in the plotted local geographic reference frame (RGLP) corresponding to the position of the platform on the date of acquisition of the image must be established with one and the same common local geographic reference frame (RGLC). For this RGLC, it is possible to choose, for the origin, the reference position (PR) corresponding to that observed upon the acquisition of a terrain christening phase image for example the first or last image. Generally, each direction '$v_m$' in a local geographic reference frame associated with an image corresponding to the position Pm can be transferred into a direction '$v_n$' in the local geographic reference frame of a position Pn by using a linear relationship of the form $v_n = R(P_n)R^T(P_m)v_m$. In this expression, the elements R are rotation matrices (3×3) whose elements depend only on the geodetic coordinates (longitude and latitude) of the image upon the acquisition via trigonometric functions and the exponent '$T$' indicates the transpose of the corresponding rotation. When the positions Pn and Pm are not too distant, a differential relationship can also be used to characterize, in the form of elementary angles, the deviation of the direction $v_n$ in relation to the direction $v_m$.

In practice, the airborne systems access the kinematic parameters of position 31, speed, acceleration of the platform and its attitude. They generally have specific means making it possible to establish the attitude of the image by local geographic reference frame and therefore in any type of reference system. Such information has associated errors and is used to initialize and linearize the non-linear equations involved in the bundle adjustment procedure.

At the output of the procedure, the values of the initial parameters are improved and characterized by a covariance.

If the system accesses one or more GCPs, then the bundle adjustment performance may be improved significantly.

For a better understanding, a system in which the initial orientations of the images vary from one to a few milliradians, generates a minimum error of 30 m to 30 km. By basic reasoning, the effect of this error in azimuth and therefore in tangential positioning can be evaluated. Note that a circular error in elevation is reflected by a much greater error on the ground for oblique viewing angles since the circular error is approximately multiplied by the ratio of the distance (between the system and the point to be located) to the height of the system on the ground.

The access to a GCP with a quality of 5 m at 20 km makes it possible to access an orientation quality of ¼ milli-radian i.e. 4 times better than the initial performance; a GCP of 3 m at 30 km will make it possible to improve the orientation performance by an order of magnitude with a potential angular performance of $\frac{1}{10}$ milli-radian! Note, finally that the bundle adjustment algorithm used for example in the fine registration step will propagate the benefit of such an absolute reference to the orientation of all of the overlapping images.

On a mobile platform of aircraft type (or even a ship or vehicle) the following particular features are stressed:

The positions of the different images are substantially different but known while being able to be the subject—like the orientations of the images—of an estimation in the bundle adjustment step.

In this implementation, the relative attitude is generally fairly well known (a few tens of prad over a short period if there is little maneuvering of the platform) which facilitates the mappings of descriptors (step C1) and the initialization of the non-linear estimations (step E1). Moreover, the absolute orientation of the images is also fairly good and of the mrad order (facilitates the step D1); on the other hand, a mounting bias (a few mrad) will preferably be modelled in the equations of the image capture model so as to estimate it in the same way as the focal length in the step E1.

Obviously, knowing the direction of the object, it is possible to determine its geographic location, when, for example, the imaging device is equipped with a rangefinder and/or by using methods known to those skilled in the art.

This method for determining the absolute direction of an object in an image can notably be implemented from a computer program product, this computer program comprising code instructions making it possible to perform the steps of the method. It is stored on a computer-readable medium. The medium can be electronic, magnetic, optical, electromagnetic or be a broadcast medium of infrared type. Such media are, for example, semiconductor memories (random access memory RAM, read-only memory ROM), tapes, disquettes or disks, magnetic or optical (Compact Disc-Read Only Memory (CD-ROM), Compact Disc-Read/Write (CD-R/W) and DVD).

Although the invention has been described in relation to particular embodiments, it is obvious that it is in no way limited thereto and that it includes all the technical equivalents of the means described and their combinations provided the latter fall within the scope of the invention.

The invention claimed is:

1. A method of determining the absolute geographic direction of an object of a scene, with a desired performance in azimuth and elevation of the 0.1 to milli-radian class, comprising a learning phase and an online operation phase, the learning phase comprising the following steps:
  acquisition by circular scanning by a channel of a first optronic imaging device in the visible, near infrared, short infrared, medium infrared or far infrared domain, of determined fixed position, of a series of partially overlapping optronic images, including an image or several images of the scene (step A1),
  automatic extraction from the images, of descriptors defined by their image coordinates and their radiometric characteristics, with at least one descriptor of unknown direction in each overlap of images (step B1),
  from the descriptors extracted from the overlaps between images, automatic estimation of the mutual relative rotation of the images and mapping of the descriptors extracted from the overlaps (step C1),
  identification in the images, of at least one known reference geographic direction of precision compatible with the desired performance, and determination of the image coordinates of each reference (step D1),
  from the descriptors extracted from the overlaps and mapped, the direction and image coordinates of each reference, automatic estimation of the attitude of each image and estimation of the focal length of the first imaging device with precision compatible with the desired performance, being a fine registration step (step E1),
  from the attitude of each image, the position and internal parameters of the first imaging device including the focal length, and the image coordinates of each descriptor, computation of the absolute directions of the descriptors according to a predetermined model of image capture of the imaging device (step F1), the online operation phase comprising the following steps:
  acquisition of at least one image of the object called current image, from a second imaging device in the same fixed position as the first imaging device (step A2),
  automatic extraction of descriptors from each current image (step B2),
  automatic mapping of the descriptors of each current image with the descriptors whose absolute direction was calculated in the learning phase, to determine the absolute direction of the descriptors of each current image (step C2),
  from the absolute directions of the descriptors of each current image, automatic estimation of the attitude of each current image (step D2),
  from the image coordinates of the object in each current image, the attitude of each current image, the position and internal parameters of the second imaging device, automatic computation of the absolute direction of the object according to a model of image capture of each current image (step E2).

2. The method of automatically determining the absolute direction of an object as claimed in claim 1, wherein the focal length of the first imaging device is different from the focal length of the second imaging device.

3. The method of automatically determining the absolute direction of an object as claimed in claim 1, wherein a precise position of the first imaging device of the learning phase and/or the internal parameters of the first imaging device of the learning phase are estimated in the fine registration step.

4. The method of automatically determining the absolute direction of an object as claimed in claim 1, wherein the internal parameters including the focal length of the second imaging device of the online phase are estimated in the step of estimating the attitude of each current image.

5. The method of automatically determining the absolute direction of an object as claimed in claim 1, wherein the first and second imaging devices are one and the same imaging device.

6. The method of automatically determining the absolute direction of an object as claimed in claim 1, wherein the descriptors of the learning phase are archived in a database with their radiometric characteristics and their absolute directions.

7. The method of automatically determining the absolute direction of an object as claimed in claim 1, wherein a map of density of the spatial distribution of the descriptors is constructed before the online operation phase, by determining and positioning cells in azimuth and elevation and by indicating the number of descriptors found in these cells.

8. The method of automatically determining the absolute direction of an object as claimed in claim 1, wherein the series of images acquired in the learning phase covers a complete horizon revolution.

9. The method of automatically determining the absolute direction of an object as claimed in claim 1, wherein the series of images acquired in the learning phase covers a portion of complete horizon rotation and at least two references are identified in the images.

10. The method of automatically determining the absolute direction of an object as claimed in claim 1, wherein the position of the first imaging device is determined by positioning means with which said device is equipped or is estimated from several references.

11. The method of automatically determining the absolute direction of an object as claimed in claim 1, wherein the object is absent from the images acquired during the learning phase.

12. The method of automatically determining the absolute direction of an object as claimed in claim 1, comprising a step of construction of a panoramic image from finely registered images, and wherein each pixel of the panoramic image is associated with an absolute direction.

13. The method of automatically determining the absolute direction of an object as claimed in claim 1, wherein the series of images acquired are video images.

14. The method of automatically determining the absolute direction of an object as claimed in claim 1, wherein the series of images is acquired image by image.

15. The method of automatically determining the absolute direction of an object as claimed in claim 1, wherein each image acquired is associated with an elevation.

16. The method of automatically determining the absolute direction of an object as claimed in claim 1, wherein each reference is a terrestrial landmark or a celestial object.

17. A non-transitory computer readable medium storing a computer program causing a computer to execute, comprising code instructions making it possible to perform the steps of the method as claimed in claim 1, when said program is run on a computer.

* * * * *